2,879,305
PRODUCTION OF ACETALS OF PROPARGYL ALDEHYDE

Heinrich Pasedach, Ludwigshafen (Rhine), and Georg Schmidt-Thomée, Heidelberg, Germany, assignors to Badische Anilin- & Soda-Fabrik Aktiengesellschaft, Ludwigshafen (Rhine), Germany No Drawing. Application November 23, 1956
Serial No. 623,814

5 Claims. (Cl. 260—615)

This invention relates to a process for the production of acetals of propargyl aldehyde and in particular it relates to a process for the direct production of the acetals of propargyl aldehyde by the reaction of propargyl aldehyde or the half acetals of propargyl aldehyde with the corresponding alcohols or mixtures of alcohols.

It has hitherto been known that acetals are formed when aldahydes are reacted with alcohols in the presence of water-binding substances, as for example calcium chloride of zinc chloride. If this method of operation is used for the production of propargyl aldehyde acetals, the unstable aldehyde is almost entirely converted into brown resinification products. For this reason the acetals of propargyl aldehyde have hitherto been prepared by a circuitous way through acrolein dibromide by splitting off 2 molecules of hydrogen bromide or according to U.S. patent specification No. 2,508,257 from the acetals of alpha-chloracroleins by splitting off 1 mol of hydrogen chloride.

It is an object of the present invention to avoid the formation of byproducts by resinification of the unstable propargyl aldehyde in the reaction thereof with alcohols in the presence of dehydrating agents and thereby to improve the yields.

A further object of the invention is to avoid the roundabout way of the prior art method of manufacture via the halogen compounds of acrolein or acrolein acetals and to prepare pure acetals which as compared with free propargyl aldehyde are stable compounds and are therefore better suited as intermediate products for syntheses, for example of 2-aminopyrimidine or methylglyoxal.

We have now found that the acetals of propargyl aldehyde are obtained in a simple manner and with good yields by reacting propargyl aldehyde or its half acetals with alcohols in the presence of dehydrating agents with the addition of sulfur dioxide. In the same way, mixed acetals of propargyl aldehyde can be obtained by reacting propargyl aldehyde with mixtures of alcohols or by reacting a half acetal with another alcohol.

It is not necessary to start with anhydrous propargyl aldehyde. Any water introduced is bound, like the water of reaction, by the dehydrating agent.

The water-binding, dehydrating or water-extracting agents, for example calcium chloride, zinc chloride, potassium sulfate and desiccatives are preferably added in amounts of 10 to 60% by weight with reference to the propargyl aldehyde used. For the acetalization there may be used saturated and unsaturated aliphatic alcohols with 1 to 4 carbon atoms and one or two hydroxyl groups. If the propargyl aldehyde is reacted with a dihydric alcohol, as for example with ethylene glycol, the corresponding cyclic acetals are obtained. One mol of propargyl aldehyde is preferably reacted with two to four mols of alcohol. A large excess of alcohol is not attended by any special advantage. The reaction is in general carried out at temperatures of 0° to 60° C., in particular 15° to 30° C.

The reaction is preferably carried out by introducing the propargyl aldehyde or its half acetals into a mixture of, for example calcium chloride and alcohol to which sulfur dioxide has been added, at room temperature and stirring the resultant mixture until the end of the evolution of heat. It is advantageous to lead away the heat generated by cooling.

Sulfur dioxide may be led in during the reaction of the propargyl aldehyde with the alcohols while stirring. In general 1 to 20 parts by weight of sulfur dioxide to 100 parts of propargyl aldehyde are sufficient. It is known that the half acetal formation will also take place without the addition of sulfur dioxide, but it is possible also in the half acetal formation to use sulfur dioxide in the sense of the present invention. For the formation of the acetals, however, the addition of sulfur dioxide is decisive.

Towards the end of the reaction, the mixture, which originally was homogeneous, separates into two layers of which the upper layer consists of practically pure acetal. After separation and neutralization of the excess sulfur dioxide, the acetal layer, after drying, can be distilled.

In cases in which no phase separation takes place, however, the working up may be by neutralizing the reaction product and taking it up in a suitable solvent.

The following examples will further illustrate this invention but the invention is not restricted to these examples. The parts specified in the examples are parts by weight.

Example 1

200 parts of propargyl aldehyde are introduced at 20° C. into 120 parts of methanol and the whole cooled to lead away the heat of reaction during the formation of the half acetal. The mixture is introduced at 15° to 20° C. while stirring into a solution of 110 parts of calcium chloride in 200 parts of methanol to which 40 parts of sulfur dioxide have been added. The reaction temperature is kept at 15° to 20° C. by cooling. After a short time, the acetal begins to separate; after stirring for about an hour, when the propargyl aldehyde odor has disappeared, the acetal is separated from the calcium chloride solution below the same.

The acetal formed is washed neutral wtih cold potassium carbonate solution, dried with calcium carbonate and distilled.

327 parts of propargyl aldehyde dimethyl acetal of the boiling point 70° C. at 170 mm./Hg are obtained, i.e. 89% of the theoretical yield.

Example 2

A mixture of 478 parts of aqueous propargyl aldehyde containing 35% of water and 160 parts of propargyl alcohol is introduced, as described in Example 1, into 200 parts of methanol and reacted with a mixture of 250 parts of calcium chloride, 200 parts of methanol and 50 parts of sulfur dioxide.

The acetal layer is neutralized, dried and distilled. 250 parts of propargyl aldehyde dimethyl acetal of the boiling point 110° to 112° C. at 760 mm./Hg and 92 parts of propargyl aldehyde methyl-propargyl acetal of the boiling point 82° C. at 30 mm./Hg are obtained.

Example 3

A solution of 200 parts of propargyl aldehyde in 120 parts of ethanol prepared while cooling is dripped at 20° to 30° C. into a mixture of 100 parts of calcium chloride, 200 parts of ethanol and 40 parts of sulfur dioxide while stirring and the reaction mixture is stirred overnight. The organic solution is then separated, neutralized with potassium carbonate solution, dried and distilled. 263 parts of propargyl aldehyde diethyl acetal of the boiling point 66° C. at 50 mm./Hg are obtained.

Example 4

A solution of 40 parts of 95% propargyl aldehyde in 56 parts of propanol which has been prepared while cooling is dripped into a mixture of 30 parts of calcium chloride, 75 parts of propanol and 8 parts of sulfur dioxide while stirring and the reaction mixture is stirred overnight. Potassium carbonate solution is then added until there is a weak alkaline reaction and the organic constituents are taken up in ether, the ethereal solution washed three times with water, dried and distilled. 60 parts of propargyl aldehyde dipropyl acetal of the boiling point 77° C. at 20 mm./Hg are obtained.

Example 5

A solution of 40 parts of 95% propargyl aldehyde in 70 parts of butanol which has been prepared while cooling is dripped during the course of 3 hours into a mixture of 30 parts of calcium chloride, 93 parts of butanol and 8 parts of sulfur dioxide while stirring and the reaction mixture is further stirred for 2 hours. After working up as in Example 4, 70 parts of propargyl aldehyde dibutyl acetal of the boiling point 69° C. at 0.6 mm./Hg are obtained.

What we claim is:

1. A process for the production of acetals of propargyl aldehyde which comprises reacting propargyl aldehyde in amount of 100 parts by weight with an aliphatic alcohol containing 1 to 4 carbon atoms in the molecule in the presence of a dehydrating agent selected from the group consisting of calcium chloride, zinc chloride and potassium sulfate in amounts of 10 to 60 parts by weight and with the addition of 1 to 20 parts by weight of sulfur dioxide at temperatures of 0° to 60° C.

2. A process for the production of acetals of propargyl aldehyde which comprises reacting propargyl aldehyde in amount of 100 parts by weight with a saturated monohydric aliphatic alcohol containing 1 to 4 carbon atoms in the molecule in the presence of a dehydrating agent selected from the group consisting of calcium chloride, zinc chloride and potassium sulfate in amounts of 10 to 60 parts by weight and with the addition of 1 to 20 parts by weight of sulfur dioxide at temperatures of 0° to 60° C.

3. A process for the production of acetals of propargyl aldehyde which comprises reacting propargyl aldehyde in amount of 100 parts by weight with a mixture of propargyl alcohol and a saturated aliphatic alcohol containing 1 to 4 carbon atoms in the molecule in the presence of a dehydrating agent selected from the group consisting of calcium chloride, zinc chloride and potassium sulfate in amounts of 10 to 60 parts by weight and with the addition of 1 to 20 parts by weight of sulfur dioxide at temperatures of 0° to 60° C.

4. A process for the production of acetals of propargyl aldehyde which comprises reacting a hemi-acetal of propargyl aldehyde in amount of 100 parts by weight with a saturated aliphatic alcohol containing 1 to 4 carbon atoms in the molecule in the presence of a dehydrating agent selected from the group consisting of calcium chloride, zinc chloride and potassium sulfate in amounts of 10 to 60 parts by weight and with the addition of 1 to 20 parts by weight of sulfur dioxide at temperatures of 0° to 60° C.

5. A process for the production of acetals of propargyl aldehyde which comprises reacting propargyl aldehyde in amount of 100 parts by weight with a mixture of saturated aliphatic alcohols containing 1 to 4 carbon atoms in the molecule in the presence of a dehydrating agent selected from the group consisting of calcium chloride, zinc chloride and potassium sulfate in amounts of 10 to 60 parts by weight and with the addition of 1 to 20 parts by weight of sulfur dioxide at temperatures of 0° to 60° C.

References Cited in the file of this patent

UNITED STATES PATENTS 2,098,108   Reppe et al. _____ Nov. 2, 1937